Feb. 8, 1927.　　　　　　　　　　　　　　　　1,616,522
H. P. WESTCOTT
DIFFERENTIAL PRESSURE GAUGE FOR ORIFICE METERS
Filed Aug. 2, 1922　　　2 Sheets-Sheet 1

Inventor
Henry P. Westcott
By
Attorney

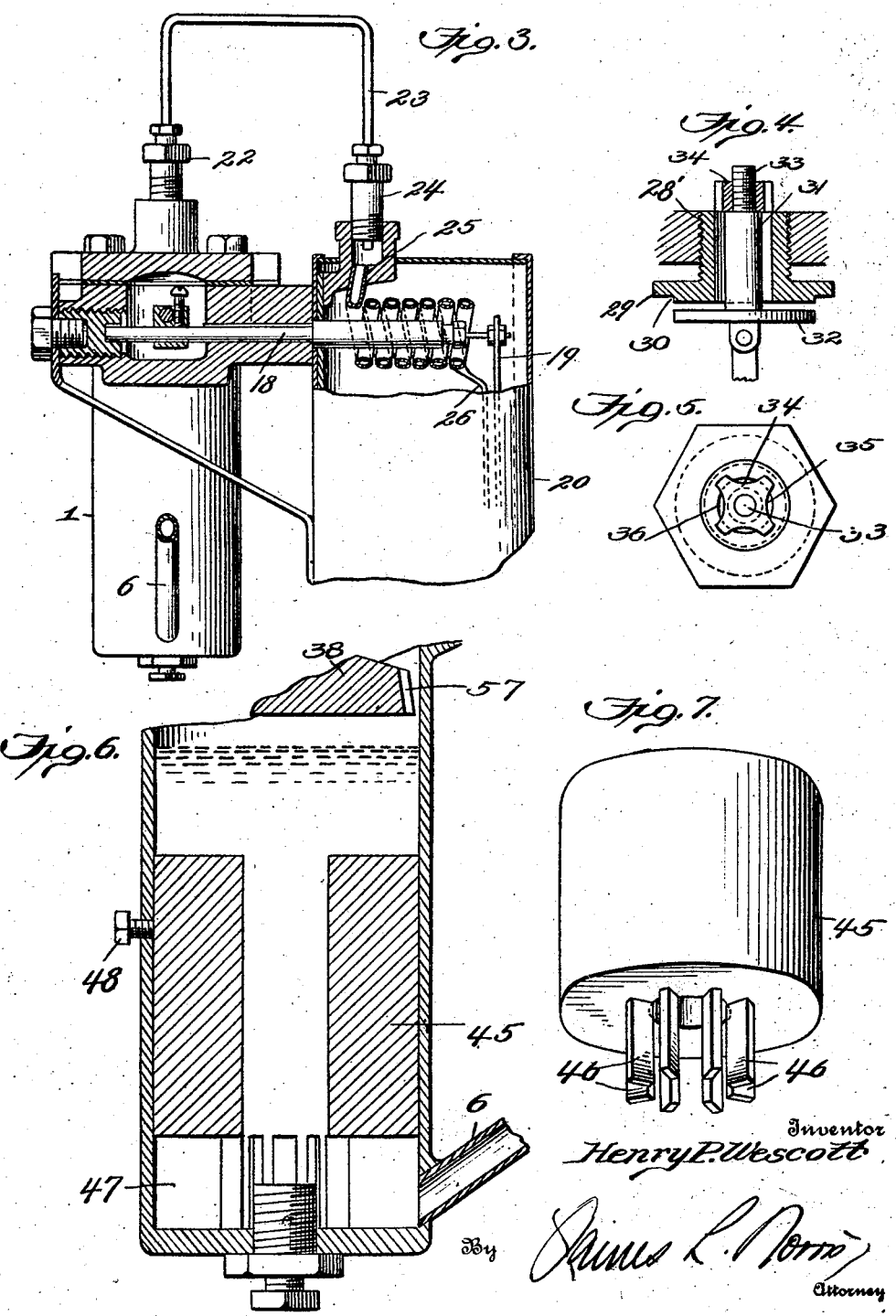

Patented Feb. 8, 1927.

1,616,522

UNITED STATES PATENT OFFICE.

HENRY P. WESTCOTT, OF ERIE, PENNSYLVANIA; ADA K. WESTCOTT ADMINISTRATRIX OF THE SAID HENRY P. WESTCOTT, DECEASED.

DIFFERENTIAL-PRESSURE GAUGE FOR ORIFICE METERS.

Application filed August 2, 1922. Serial No. 579,294.

This invention relates to differential pressure gauges for orifice meters and is particularly adapted for the measuring of the output of natural gas wells. The invention proposes the construction of a gauge of the character just mentioned in which the static pressure of the gas passing through said meter and its differential pressure on opposite sides of the orifice are both registered and recorded, in order that the volume of gas flowing through said meter may be computed therefrom.

One of the objects of the invention is the provision of a gauge in which the gas pressures on opposite sides of the orifice are impressed upon the opposite ends of a mercury-seal contained in said gauge, there being a float in the down-stream end of said mercury seal connected with mechanism for recording and registering the static pressure, and a conduit communicating with the pressure chamber at either end of the mercury seal and leading to a device for recording and registering the differential pressure.

Another object of the invention is the construction of the float in such manner as to be mercury-lubricated, so as to avoid sluggishness or retardation in the operation of said float due to frictional resistance between its edges and the walls of the chamber in which it operates.

Still another object of the invention is the provision of a system of check valves to prevent the loss of mercury from the gauge through the blowing of the gas through the mercury seal upon sudden excessive peaks of differential pressure, one of said valves being positively operated by a float, directly attached thereto, said valve being held open by the weight of said float upon recession of the mercury in the mercury seal, and closed by the buoyancy of said float when the mercury rises.

A further object of the invention is the construction of a gauge of the class described having a mercury seal contained in two communicating reservoirs of different diameter and a float in one of said reservoirs, said float being concerned with the actuation of the static pressure registration and recording means, there being one of a number of interchangeable bushings of different diameters selectively inserted in the path of communication between said reservoirs, for throttling the same and thus insuring a steady movement of the float and its associated registering and recording mechanism, notwithstanding the presence of a pulsating pressure in the gas line.

Another object of the invention is the provision of a differential pressure conduit leading from that side of the gauge which communicates with the upstream side of the orifice to the differential pressure recording and registering mechanism, said conduit being connected to the top wall of the mercury-seal chamber so as to avoid the accidental introduction of mercury into said conduit.

A further object of the invention is the provision of a series of sleeves in the upstream side of the mercury seal chamber for changing the area thereof so as to obtain a proportionately greater or less reading of the recording and registering mechanism. This expedient is resorted to for the purpose of enabling the same size of mercury seal chamber to be used in meters of different maximum capacities.

Still another object of the invention is the construction of a novel form of drain plug for the removal of the mercury from the mercury seal chamber.

Other objects will be disclosed as the description develops.

In the drawings:—

Figure 3 is a cross section taken along the line 3—3 of Figure 1.

Figures 4 and 5 are respectively a sectional side view and a plan view of the positively actuated check valve.

Figure 6 is a side view in section showing a portion of the mercury-seal chamber with a filler positioned therein.

Figure 7 is a perspective view of the filler.

Figure 1:
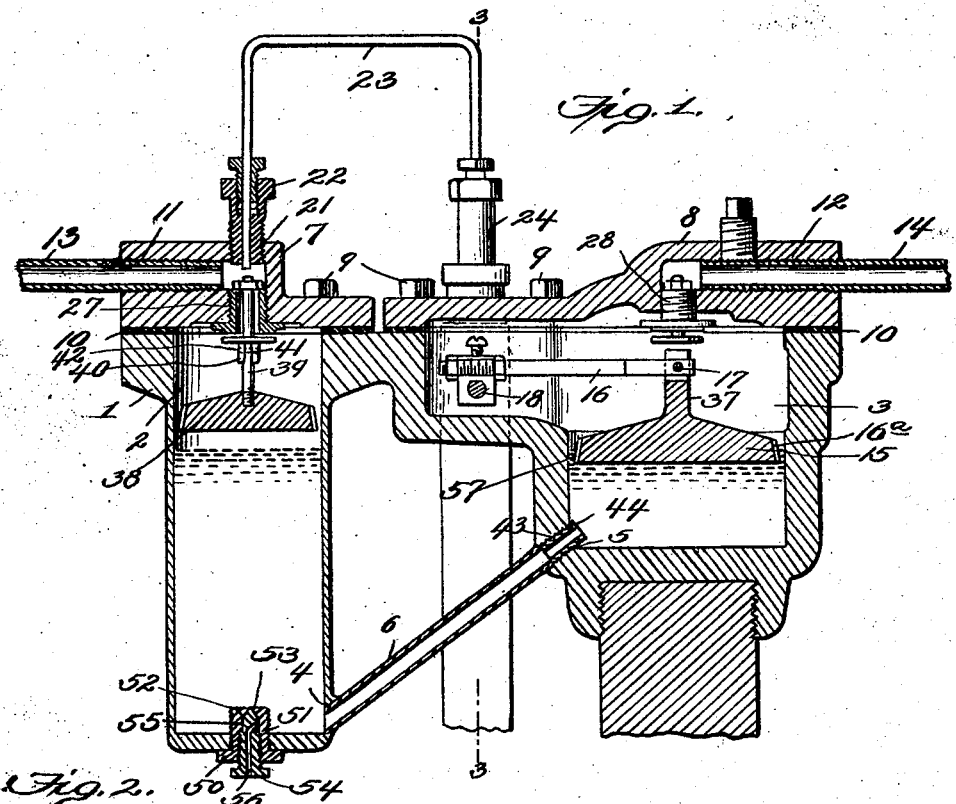
Figure 1 is a side sectional view of my improved pressure gauge.

Referring now in detail to the several figures, the numeral 1 represents a casting which is cored out to form a pair of cylindrical chambers 2 and 3. These chambers are of different diameter and length, each being provided with an aperture, 4 and 5 respectively, having inclined bores, said apertures being connected by an inclined tube 6 which is secured to the walls of the respective chambers in any suitable manner, but preferably by welding.

The chambers 2 and 3 and the passage within the tube 6 together constitute a mercury-sealed chamber in which a quantity of mercury is contained, the level of the mercury in the two cylindrical limbs of said mercury-seal chamber being, of course, the same at atmospheric pressure. The cylindrical chambers 2 and 3 are closed by cover plates 7 and 8, respectively, said cover plates being secured to the casting 1 by means of the bolts 9. A rubber gasket 10 is interposed between each of said cover plates and said casting and affords a fluid pressure-tight connection between said parts. The cover plates 7 and 8 are each cored out to form passages 11 and 12 which communicate with the chambers 2 and 3, respectively, and to which passages the conduits 13 and 14 are connected. The conduit 13 is connected to the up-stream of an orifice in a meter the conduit 14 is connected to the down-stream side.

The static pressure being the same on both sides of the orifice, the pressure on the surface of the mercury in each limb of the mercury seal will be the same but a change in static pressure will cause a displacement of mercury from one side to the other of said mercury seal-chamber through the tube 6 causing relative difference in elevation of the surface of the limbs of the mercury seal. A float 15 is placed in the chamber 3 for the purpose of taking advantage of this change of level in the surface of the mercury, the movement of said float being transmitted by means of the arm 16, to which the float is pivotally connected at 17, to a shaft 18 which carries, as shown in Figure 3, an arm 19 to the end of which is secured a recording scriber, not shown. A casing 20, into which the shaft 18 extends, houses a clockwork, not shown, which rotates a chart, also not shown, against which the scriber bears. The mark made by the scriber on the chart is a record of the change of movement of the float 15 during the time interval in which said chart rotates.

The cover plate 7 is tapped at 21 for the reception of a stuffing gland 22 through which passes a tube 23 of small internal diameter which is bent into the form of an inverted U and has at its opposite end extending therethrough another stuffing gland 24 into communication with a Bourdon tube 25 as clearly shown in Figure 3. The Bourdon tube is coiled coaxially around the shaft 18 and has a scriber arm 26 attached to the closed free end thereof, which scriber arm also bears against the rotating chart leaving a mark which is a record of the static pressure on the up-stream side of the orifice.

Figure 2:
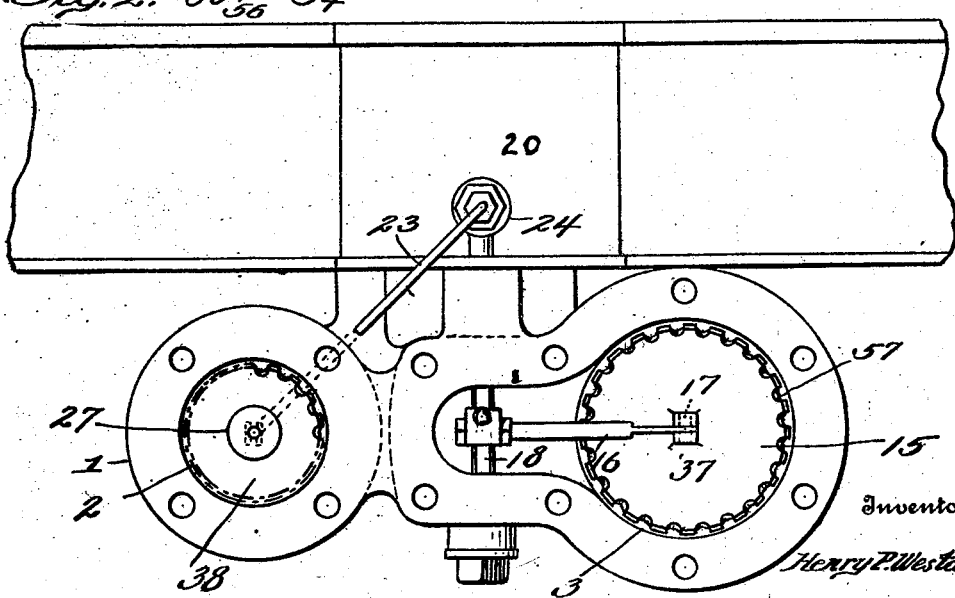
Figure 2 is a plan view of the same with the cover plates removed.

It will be noted from Figure 1 that the float 15 is formed with a slight bevel 16$^a$ along its peripheral edge and is so proportioned in mass that the level of mercury stands at a point midway of said bevel. The float is thus constructed to provide a mercury lubricated contact between the edge of said float and the wall of the chamber 3 within which it reciprocates. Since mercury forms an amalgam with all of the base metals except iron and steel it is impracticable to make the casting 1 of any material except iron or steel. These materials are, however, susceptible to rust and the nature of the gas entering into the mercury-seal chamber is such as to include the presence of moisture. Because of the relative low temperature of mercury at times, as compared with that of the gas contacting therewith or occasionally passing therethrough, the mercury becomes impregnated with condensed moisture so that the walls of the mercury-seal chamber are generally found to be rusted after a more or less brief exposure to the gas. Were the float to reciprocate unlubricated against these rusted walls a retardative effect would be imposed upon the movements of said float which would impair the accuracy of the recording and registering means actuated thereby. Even though the float were made slightly smaller than the diameter of the chamber within which it is retained, the slight swinging movement of the float would throw the upper edge thereof into contact with the rusted surface of the wall of the float chamber, giving rise to this retardative effect. But by beveling the peripheral surface of the float the upper edge is prevented from ever contacting with the wall of the float chamber, and, by proportioning the mass of the float so that the mercury level comes intermediate the upper and lower edges thereof, said lower edge is always immersed in mercury and therefore said edge contacts with the wall of the float chamber beneath the level of the mercury during the movements of the float and the contacting surfaces are lubricated by the mercury, so that the friction between the rusted surfaces of the wall of the float chamber and said float is minimized. Moreover by reason of the wedge shaped annular space between the float and the wall of the float chamber the mercury is forced out between said float and said wall upon rise of said float, tending to prevent swinging of the float and consequent contact of the same with said wall. The periphery 57 of the float is cut away or corrugated, as shown in Figure 2, so as to reduce the length of the contacting edge of said float, by which means the friction between said float and the wall of the float chamber is further diminished.

It sometimes happens that too small an orifice is used in the meter for the pressure of gas being measured so that the differential pressure on one side of said orifice becomes so great as to displace the entire mercury seal into one limb of the mercury seal chamber, thus overflowing the same, the gas in such event, bubbling through the mercury and passing directly through the conduit 13 to the conduit 14. Occasionally, and particularly when the pump by means of which the gas is being withdrawn from the well becomes deranged, conditions are reversed and the mercury is forced into the opposite limb of the mercury seal chamber. In either case the high level of the mercury and the bubbling of the gas therethrough are likely to cause the overflow of some of said mercury into the conduits 13 and 14, such mercury becoming lost or necessitating a drainage of portions of the gas measuring system extraneous to the gauge for its recovery. The withdrawal of an appreciable amount of mercury in such manner creates a false level in the gauge, impairing the accuracy of the record. To prevent the loss of mercury by overflow, check valves 27 and 28 are arranged in the cover plates 7 and 8 to control the passage leading from the chambers 2 and 3 to the gas conduits 13 and 14. These valves are, up to a certain point similar in construction, one of them being shown on an enlarged scale in Figure 4 and consisting of a threaded bushing 28' screwed into the cover plate and having a flanged lower end 29 on which is formed a valve seat 30. A valve stem 31 passes through the bore of the bushing 28' and has its lower end integrally formed with the valve disk 32, the valve being adapted upon reciprocation of the stem 31 to cause the valve disk 32 to engage the valve seat 30. The upper end of the valve stem 31 is reduced in diameter and threaded as shown at 33 and is retained in place by means of a nut 34, the outer surface of which is cut out in the form of a spider as shown at 35 in Figure 5, providing at all times open passages 36 between said nut and the bore within said bushing. The valve disk 32 of the check valve 28 is arranged in the path of the stem 37 of the float 15, to be engaged by the latter upon abnormal upward movement of the float so as to be moved against its seat in advance of the rise of the mercury within the chamber 3 to a point where its overflow would become possible. There is normally a space between the stem 37 and the valve disk 32 to allow for the normal movement of said float without affecting the valve 28. The valve 27, however, is positively actuated by means of the float 38 which has a stem 39 pivotally connected to the valve disk by means of spaced lugs 40 extending from the lower face of said valve disk and embracing a flattened apertured portion 41 of the stem 39, a pin 42 passing through extension and lugs and serving as a pivotal connection for the joint between the two. The float 38 is normally suspended a slight distance above the level of the mercury when the pressure on the two sides of the mercury seal is equal. However, when the pressure in the chamber 3 exceeds the pressure in the chamber 2 the mercury in the chamber 2 will rise and come into contact with the float 38 causing it to rise and close the check valve 27. Such a condition will exist when there is a leak in the line 13 or a break in the main line ahead of the meter and a reversal of flow exists through the orifice. While it is impracticable to have a positive connection between the float 15 and the check valve 28 on account of the necessity for free movement of said float, the advantage of having a positive connection between the float 38 and the valve 27 will be appreciated when it is borne in mind that the diameter of the chamber 2 being relatively small compared with that of the chamber 3, a small change in level in the latter chamber is attended by a comparatively great change in the level of mercury in the chamber 2.

The present construction provides that, no matter how great or sudden may be the change of level in the chamber 2, the positive connection between the valve and float assures the closing of the check valve 27 before the mercury level rises to the point of overflow. The float 38 is constructed to be mercury lubricated in the same manner as the float 15.

In some installations in which my improved pressure gauge is used the flow of gas through the pipe line and through the meter is of a pulsatory character which may be due to several conditions among which are the irregular natural flow from the gas well, the fact that the well is supplying fuel to a drilling boiler or any machine whose consumption of fuel is intermittent, and, where a pump is used to withdraw the gas from the well, to the pulsatory nature of the pump.

In order to average the peaks and hollows in the pressure and to reduce the vibratory movement of the registering and recording mechanism due to the pulsatory pressure within the gas line, a pulsation bushing 43 is introduced into the aperture 5, the latter being threaded for the reception of said bushing. This bushing has a kerf 44 in its upper end for engagement by a tool by which it is screwed into place, and the bore within said bushing is of such diameter as to so restrict the passage through the tube 6 that said tube will act as a dash-pot in retarding the flow of mercury from one side of the mercury-seal chamber to the other, thus eliminating the vibratory movements of the float due to pulsation in the pipe line, and steady the recording and registering means actuated by said float. The bushing 43 is one of a number of interchangeable bushings having various interior diameters any one of which may be selectively used so as to accomplish the desired result.

The static pressure of gas wells differs greatly in different wells and varies from time to time in the same well so that it is necessary to select a gauge having a capacity suited to the pressure of the well in connection with which it is to be used. If a gauge designed for use with gas having a normally high static pressure is used in connection with a well having a relatively light pressure the movement of the recording and registering mechanism will be so slight as to render uncertain an accurate determination of the static pressure at any time. With the present invention it is possible to use the same sized meter effectively with a gas flow of any static pressure, by the simple insertion of a device by means of which the capacity of the high pressure chamber 2 is altered. To this end I have provided the filler 45, Figure 7, which has the form of a hollow cylinder and is inserted within the chamber 2 as shown in Figure 6. The lower end of the filler 45 is constructed with projecting lugs 46, spaced apart, and permitting free communication between the tube 6 and the cylindrical space 47 within said filler. The filler 45 is made of iron or steel and therefore will float in mercury and is held against the bottom of the chamber 2 by means of a set screw which extends through the wall of the float chamber. The object of the filler 45 is to reduce the capacity of the chamber 2 so as to proportionately reduce the elevation of the mercury level in the float chamber 3 upon a given recession of mercury in the chamber 2 by which means the range of movement of the registering and recording means actuated by the float 15 is proportionately diminished. By leaving out the filler the diameter of the mercury column in chamber 2 is increased so that a proportionately larger volume of mercury is transferred to the float chamber for a given drop in level in the chamber 2 thus magnifying the range of movement of the registering and recording mechanism so as to avoid observational errors which would otherwise arise from the reading of small gas pressures. The use of the filler 45 materially cheapens the cost of manufacture of the gauge and improves the maintenance of service by permitting the manufacture of but one size of casting, namely that for a gauge adapted to measure low gas pressures, and the keeping on hand one or two sizes of filler by means of which the capacity of the high pressure chamber may be reduced to provide any desired ratio between the height of rise in the one chamber and the depth of fall of the mercury in the other chamber. This arrangement of using fillers in the high pressure portion of the gauge eliminates the necessity of changing the working mechanism of the float levers etc. and enables one to change the mechanism range of the gauge by simply inserting or removing the fillers from the high pressure portion of the gauge, that is in the chamber 2. It is obvious that the range of the gauge can be changed by simply changing the sizes and openings of said fillers.

It frequently happens that, due to some extraordinary peak in the differential pressure the mercury seal is displaced into one limb of the mercury seal chamber, as hereinbefore explained, permitting the gas to bubble directly through the body of mercury and pass from one side of the mercury-seal chamber to the other. As the temperature of the mercury is generally lower than that of the gas passing therethrough, condensation takes place, not only of the moisture of the gas but also of the volatile constituents thereof such as gasoline and other oily condensates, which emulsify with the mercury lowering its specific gravity, increasing its mass and thus seriously impairing the accuracy of the gauge. When such a state of mercury exists it becomes necessary to remove it from the gauge in order to separate from it these foreign condensates. For this purpose a drain plug 50, shown in section in Figure 1, is provided, which is formed with a threaded bore 51 tapered at its inner end as shown at 52 and having a minute central aperture 53 communicating with the mercury-seal chamber. A needle valve 54 screws into the bore 51 and has a reduced portion 55 forming with the wall of the bore 51 a passage which communicates by means of the central duct 56 in the needle valve 54 with the atmosphere. The end of the needle valve is tapered and seats against the tapered portion 52 of the bushing. To drain the mercury from the mercury-seal chamber the needle valve is unscrewed to withdraw the tapered end thereof from the seat 52 thus putting mercury seal chamber into communication with the central duct 56 by way of said passage. To close the drain plug it is merely necessary to screw the needle valve in until its tapered end seats against the tapered portion of said bushing Although I have thus described the preferred embodiment of my invention, it is evident that those skilled in the arts to which this relates may make various changes in the construction, combination and arrangement of the several parts without departing from the spirit and scope of the invention.

Having described my invention what I claim as new and desire to secure by Letters Patent, is:—

1. A pressure gauge comprising a casing formed with a pair of chambers, a conduit affording communication between said chambers and being connected thereto adjacent the bottom walls thereof, a mercury seal in said chambers and conduit, and a removable bushing threadedly engaging said conduit and insertable from within one of said chambers, said bushing being of restricted bore for throttling said conduit to retard the displacement of mercury from one of said chambers to the other.

2. A pressure gauge comprising a casing provided with a float chamber, a mercury seal within said float chamber, means for subjecting both limbs of said mercury seal to differential pressure, an iron float in said float chamber, indicating means actuated by said float, said float being peripherally beveled away from the wall of said float chamber above its lower edge, and the mass of said float being so proportioned as to permit it to float with the level of mercury lying in a plane intermediate its upper and lower edges, the lower edge of said float being corrugated.

3. A pressure gauge comprising a casing provided with a mercury seal chamber including a pair of reservoirs connected near their lower ends by a conduit, a mercury seal occupying said reservoirs and conduit, cover plates for said reservoirs each formed with a gas passage leading to a source of gas pressure and communicating with the space in said reservoirs above said mercury seal, inwardly opening check valves arranged in said cover plates for controlling said gas passages, a float in each reservoir operatively related to said mercury seal, and indicating means connected to one of said floats, said float being provided with a stem engageable with one of said check valves to close the same after a predetermined rise in the level of said float, and the other of said floats having a stem directly secured to the other of said check valves.

4. A pressure gauge comprising a casing provided with a mercury seal chamber comprising a pair of reservoirs connected near their lower ends by a conduit, a mercury seal occupying said reservoirs and conduit, cover plates for said reservoirs each formed with a gas passage leading to a source of gas pressure and communicating with the space in said reservoir above said mercury seal, inwardly opening check valves arranged in said cover plates for controlling said gas passages, a float in each reservoir operatively related to said mercury seal, indicating means connected to one of said floats, said float having a stem engageable with one of said check valves to close the same after a predetermined rise in the level of said float, and the other of said floats having a stem pivotally secured to the other of said check valves.

5. A pressure gauge comprising a casing provided with a float chamber, a mercury seal in said float chamber, means for subjecting both limbs of said mercury seal to differentiate gas pressure, an annular filler removably inserted within said float chamber for reducing the capacity thereof, a float supported by said mercury seal and reciprocable within the bore of said annular filler, and indicating means actuated by said float.

6. A pressure gauge comprising a casing, provided with a pair of reservoirs connected near their lower ends by a conduit and forming a mercury seal chamber, a mercury seal occupying said chamber, a cover plate for each of said reservoirs, said cover plates being formed with gas passages communicating with a source of gas pressure and with the space within said reservoirs above the limbs of said mercury seal, a conduit extending upwardly at one end from one of said cover plates and communicating at its other end with a pressure registering and recording device, inwardly opening check valves carried by said cover plates and controlling said gas passages, a float in each reservoir, one of said floats being pivotally secured to one of said check valves and indicating means actuated by the other of said floats, said last named float engaging the other of said check valves after a predetermined rise of said float.

In testimony whereof I have hereunto set my hand.

HENRY P. WESTCOTT.